United States Patent
Zigler et al.

(10) Patent No.: US 8,260,230 B2
(45) Date of Patent: Sep. 4, 2012

(54) RADIO RECEIVER AND METHOD FOR RECEIVING AND PLAYING SIGNALS FROM MULTIPLE BROADCAST CHANNELS

(75) Inventors: Jeffrey D. Zigler, Omaha, NE (US); Kevin R. Lockhart, Ogallala, NE (US); Richard D. Wooden, Ogallala, NE (US); Jacqueline J. Lockhart, Poway, CA (US); Theodore N. Myers, Fort Collins, CO (US); Evan A. Hill, Bend, OR (US); Tanya R. Jellison, Ogallala, NE (US)

(73) Assignee: Clear Channel Management Services, Inc., San Antonio, CA (US)

( * ) Notice: Subject to any disclaimer, the term of this patent is extended or adjusted under 35 U.S.C. 154(b) by 964 days.

(21) Appl. No.: 12/201,984

(22) Filed: Aug. 29, 2008

(65) Prior Publication Data

US 2009/0061807 A1 Mar. 5, 2009

Related U.S. Application Data

(60) Provisional application No. 60/969,499, filed on Aug. 31, 2007.

(51) Int. Cl.
*H04H 20/71* (2008.01)
*H04H 60/09* (2008.01)
*H04B 1/18* (2006.01)
*H04B 1/10* (2006.01)

(52) U.S. Cl. .................. 455/179.1; 455/3.04; 455/184.1; 455/303

(58) Field of Classification Search .................. 455/3.01, 455/3.02, 3.04, 3.06, 183.2, 184.1–186.1, 455/179.1, 296, 303; 725/48, 59, 61, 68, 725/89, 139, 151, 145
See application file for complete search history.

(56) References Cited

U.S. PATENT DOCUMENTS

| 5,432,542 | A | 7/1995 | Thibadeau et al. |
| 6,389,463 | B2 | 5/2002 | Bolas et al. |
| 6,546,427 | B1 | 4/2003 | Ehrlich et al. |
| 6,564,003 | B2 * | 5/2003 | Marko et al. .................. 386/241 |
| 6,725,022 | B1 | 4/2004 | Clayton et al. |
| 6,728,531 | B1 | 4/2004 | Lee et al. |
| 6,741,869 | B1 | 5/2004 | Lehr |

(Continued)

FOREIGN PATENT DOCUMENTS

WO 0116781 A1 3/2001

(Continued)

*Primary Examiner* — Simon Nguyen
(74) *Attorney, Agent, or Firm* — Garlick & Markison; Edward J. Marshall

(57) ABSTRACT

A radio receiver may comprise a receiver adaptable for receiving a plurality of broadcast streams over a plurality of broadcast channels, wherein the receiver will attempt to receive a selected broadcast stream on a selected broadcast channel, and if the selected broadcast stream is not receivable on the selected broadcast channel, the receiver will attempt to receive the selected broadcast stream on an alternative broadcast channel. A computer readable medium may allow a user of a receiver to create a composite stream comprising at least one portion selected from each of at least two of a plurality of broadcast streams. A method of open interface merge replication may involve comparing data between first and second databases, and if a conflict exists, updating one of the first and second databases with at least a portion of data from the other of the first and second databases to resolve the conflict.

25 Claims, 7 Drawing Sheets

U.S. PATENT DOCUMENTS

| | | | |
|---|---|---|---|
| 6,920,479 B2 | 7/2005 | McDowall et al. | |
| 6,934,697 B1 | 8/2005 | Warren | |
| 6,957,264 B1 | 10/2005 | Jacobs | |
| 7,003,530 B2 | 2/2006 | Johnson | |
| 7,316,026 B2 * | 1/2008 | Ohno et al. | 725/58 |
| 7,757,255 B2 * | 7/2010 | Takagi et al. | 725/50 |
| 7,865,930 B2 * | 1/2011 | Kim | 725/151 |
| 7,917,925 B2 * | 3/2011 | Eigeldinger | 725/39 |
| 7,984,467 B2 * | 7/2011 | Hansen-Turton | 725/38 |
| 8,037,497 B2 * | 10/2011 | Seo et al. | 725/54 |
| 2001/0042109 A1 | 11/2001 | Bolas et al. | |
| 2002/0073171 A1 | 6/2002 | McDowall et al. | |
| 2002/0132617 A1 | 9/2002 | Nuss et al. | |
| 2003/0026597 A1 * | 2/2003 | Cho et al. | 386/111 |
| 2003/0159143 A1 * | 8/2003 | Chan | 725/41 |
| 2005/0191958 A1 * | 9/2005 | Hoskins | 455/3.01 |
| 2005/0257237 A1 * | 11/2005 | Yamamoto | 725/72 |
| 2006/0067304 A1 | 3/2006 | McDowall et al. | |
| 2006/0126488 A1 * | 6/2006 | Kang | 370/206 |
| 2006/0168097 A1 | 7/2006 | Pittelli | |
| 2006/0184992 A1 * | 8/2006 | Kortum et al. | 725/135 |
| 2006/0245605 A1 * | 11/2006 | Matsunaga | 381/123 |
| 2007/0005795 A1 * | 1/2007 | Gonzalez | 709/232 |
| 2007/0061862 A1 | 3/2007 | Berger et al. | |
| 2007/0129003 A1 * | 6/2007 | Dunko | 455/3.06 |
| 2007/0287451 A1 * | 12/2007 | Seo et al. | 455/434 |
| 2009/0300683 A1 * | 12/2009 | Rynkowski | 725/58 |

FOREIGN PATENT DOCUMENTS

| | | |
|---|---|---|
| WO | PCTUS08074915 | 1/2009 |

* cited by examiner

RADIO RECEIVER AND METHOD FOR RECEIVING AND PLAYING SIGNALS FROM MULTIPLE BROADCAST CHANNELS

CROSS-REFERENCE TO RELATED APPLICATIONS

This application claims priority to U.S. Provisional Patent Application No. 60/969,499 filed Aug. 31, 2007, the disclosure of which is incorporated herein by reference.

COPYRIGHT NOTICE

This application contains material that is subject to copyright protection. Such material may be reproduced by any person exactly as it appears in the Patent and Trademark Office patent files or records. The copyright owner otherwise reserves all rights to such material.

BACKGROUND

This application relates generally to radio systems. More specifically, this application relates to a new type of radio receiver as well as associated systems and methods that support advanced functionality of such receiver and that more broadly apply to other systems.

SUMMARY

A radio receiver may comprise a receiver adaptable for receiving a plurality of broadcast streams over a plurality of broadcast channels, wherein the receiver will attempt to receive a selected broadcast stream on a selected broadcast channel, and if the selected broadcast stream is not receivable on the selected broadcast channel, the receiver will attempt to receive the selected broadcast stream on an alternative broadcast channel. A computer readable medium may allow a user of a receiver to create a composite stream comprising at least one portion selected from each of at least two of a plurality of broadcast streams. A method of open interface merge replication may involve comparing data between first and second databases, and if a conflict exists, updating one of the first and second databases with at least a portion of data from the other of the first and second databases to the extent necessary to resolve the conflict, whether or not the first and second databases share the same format.

BRIEF DESCRIPTION OF THE APPENDIX

Appendix A, which is attached hereto and incorporated herein by reference, lists certain EPG and database identifiers as may be used in some embodiments.

DETAILED DESCRIPTION

Figure 1:
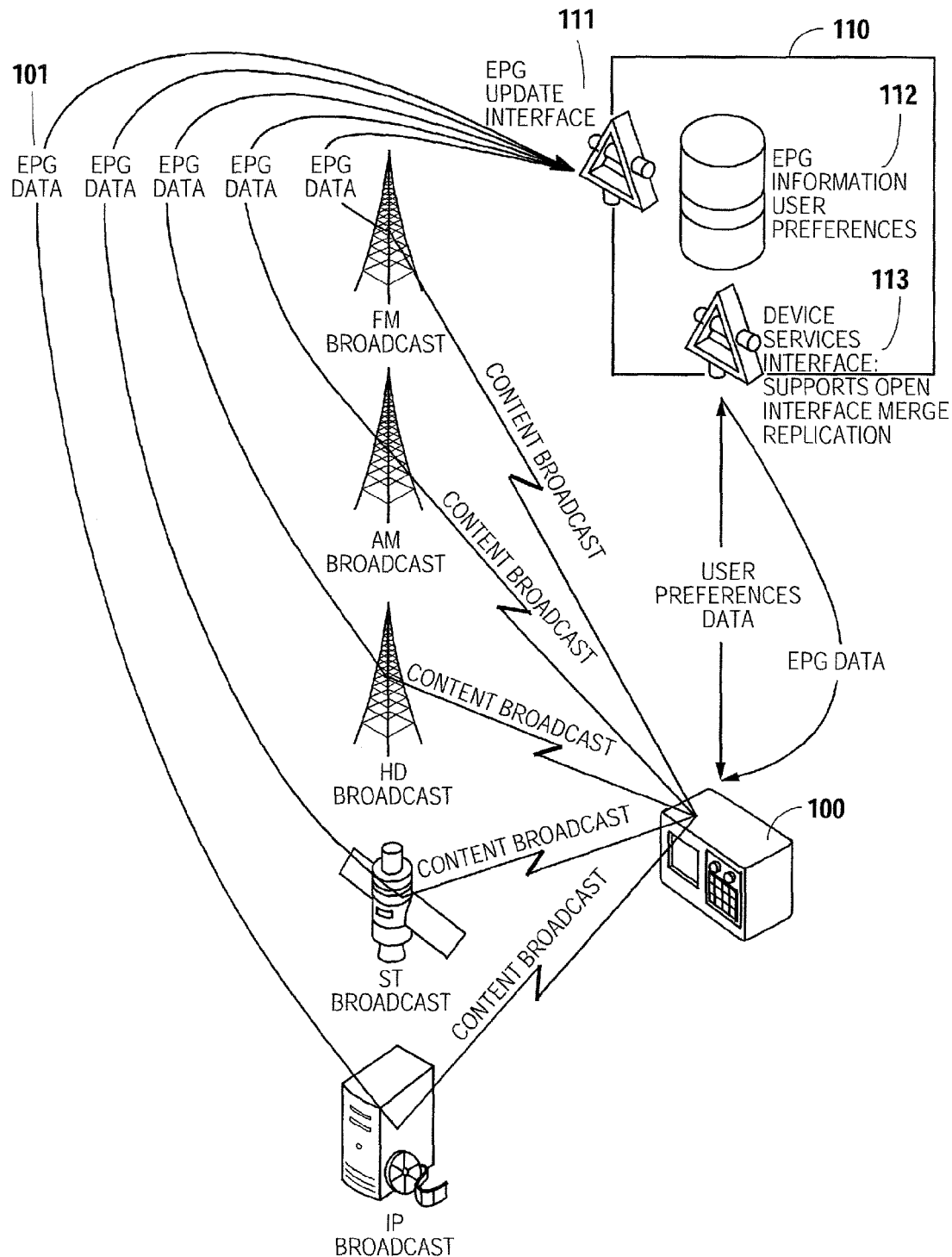
FIG. 1 is a schematic diagram of a radio system for processing broadcast streams.

As used herein, the following terms should be understood to have the indicated meanings:

When an item is introduced by "a" or "an," it should be understood to mean one or more of that item.

"AM" means amplitude modulation.

"Broadcast channel" means a communications medium having one or more properties that distinguish such communications medium from one or more other communications media. The one or more properties may include but are not limited to a particular type of medium (such as, for example, over-the-air, or cable), a particular transmission basis (such as, for example, terrestrial or satellite), a particular type of signal (such as, for example, digital, analog, or HD), a particular type of signal transmission (such as, for example, AM, FM, or IP), a particular frequency or frequency range, a particular source (such as, for example, a radio station, a computer server, or an end-user computer), or combinations thereof.

"Broadcast stream" means a communications signal representative of selected data. A broadcast stream may be transmitted over one or more broadcast channels.

"Communications signal" means a signal representative of data. A communications signal may include but is not limited to an acoustical, electrical, electromagnetic, optical, or other signal, or a combination thereof. Examples of communications signals include but are not limited to radio frequency signals, television signals, microwave signals, cellular signals, optical signals, and combinations thereof.

"Composite stream" or "CS" means a communications signal representative of data selected from a plurality of broadcast streams.

"Component" means any part, feature, or element, alone or in combination.

"Comprises" means includes but is not limited to.

"Comprising" means including but not limited to.

"Computer" means any programmable machine capable of executing machine-readable instructions. A computer may include but is not limited to a general purpose computer, microprocessor, computer server, digital signal processor, mobile phone, personal digital assistant, or a combination thereof. A computer may comprise one or more processors, which may comprise part of a single machine or multiple machines.

"Computer program" means a list of instructions that may be executed by a computer to cause the computer or another device in communication with the computer to operate in a desired manner.

"Computer readable medium" means an article of manufacture having a capacity for storing one or more computer programs, one or more pieces of data, or a combination thereof. A computer readable medium may include but is not limited to a computer memory, hard disk, memory stick, magnetic tape, floppy disk, optical disk (such as a CD or DVD), zip drive, or combination thereof.

"Data" means information.

"Database" means a collection of data embodied in at least one computer readable medium and organized in a suitable way to permit a computer to select one or more desired portions of such data.

"Electronic program guide" or "EPG" means a computer program having instructions for displaying data representative of one or more broadcast streams that may be available over one or more broadcast channels. An EPG may or may not have instructions for allowing a user to navigate through data representative of a plurality of broadcast streams and to select a desired one of the plurality of broadcast streams. An EPG may or may not include a graphical user interface.

"FM" means frequency modulation.

"Having" means including but not limited to.

"HD" means of or relating to In-Band On-Channel digital signal communications. An HD signal may comprise data of any desirable type, including without limitation text, audio, or other content, such as for example text messages concerning a song title, artist name, weather forecast, weather warning, traffic update, sports score, advertiser phone number, web address, or any other customized text message readout, or any combination thereof. An HD signal may be transmitted as a substantially continuous digital data stream or an intermittent digital data stream and may be broadcast together with, or over the same broadcast spectrum as, existing AM or FM broadcast spectrums, for example. HD signals may also be multicasted, or split into several broadcast channels over a broadcast spectrum.

"IP" means Internet Protocol.

"LED" means light emitting diode.

"Marks" means electronic metadata associated with an entertainment data file or broadcast stream that can be used for identifying, indexing, authentication, matching, purchasing, previewing, or organizing the received entertainment data file or broadcast stream on a receiver.

The "marks" may also be used for storing the entertainment data file or broadcast stream on the receiver or viewing information about the data file or broadcast stream, such as information about the artist or other information.

"Marking" or "marked" means a process of using a button or selector switch on a receiver to select marks for identifying, indexing, authentication, matching, purchasing, previewing or organizing an entertainment data file or broadcast stream.

"Memory" means a device that is used to store or process data, programs, instructions, or any other information on a temporary or permanent basis.

"Podcast" means a file, including but not limited to audio, visual, or audiovisual data, that may be transmitted or distributed over the Internet or other network in one or more user-defined time frames, such as for example through a publish and subscribe model. A podcast may be archived on the Internet or other network or may be streaming such that it is accessible by a computer or receiver automatically and may be downloaded or transmitted to the receiver or computer on demand or on a subscription basis.

"Receiver" means an apparatus adaptable for receiving a communications signal and generating a perceptible representation of such communications signal, either directly or through one or more other devices. Such perceptible representation may include but is not limited to an audible representation, a visible representation, a tactile representation, or a combination thereof. Such perceptible representation may be perceptible either with or without the aid of another device, such as, for example, an earpiece, headphone, headset, handset, viewing lens, or the like. A receiver may or may not have a speaker, display screen, light (such as an LED), vibrator, or other output device, or a combination thereof. A receiver may or may not include a computer processor, memory, or other computer components.

"RSS" or "Really Simple Syndication" means an XML format for distributing periodically updated information on the Internet or other network. RSS may be used, for example, to enable a publish and subscribe model to work in podcasting, blogging, and other websites that change or add to their content regularly.

"ST" means satellite.

"Tags" means electronic metadata associated with an entertainment data file or broadcast stream that can be used for identifying, indexing, authentication, matching, purchasing, previewing, or organizing the received entertainment data file or broadcast stream on a receiver. The "tags" may also be used for storing the entertainment data file or broadcast stream on the receiver or viewing information about the data file or broadcast stream, such as information about the artist or other information.

"Tagging" or "tagged" means a process of using a button or selector switch on a receiver to select tags for identifying, indexing, authentication, matching, purchasing, previewing or organizing an entertainment data file or broadcast stream.

"Transmitter" means an apparatus adaptable for transmitting a communications signal.

U.S. patent application Ser. No. 11/499,434 filed Aug. 4, 2006, Ser. No. 11/477,156 filed Jun. 27, 2006, and Ser. No. 11/365,545 filed Mar. 1, 2006 are incorporated herein by reference. The methods discussed in those references may be used as a basis for tagging or marking broadcast files used in some embodiments. One embodiment comprises a method of allowing a user to purchase or copy a broadcast file after tagging or marking the broadcast file on a receiver. A user may be given an opportunity to purchase the broadcast file electronically. The tags or marks may indicate where the broadcast file will be purchased from or copied from, for instance, from an iTunes®. web site or other web site. The tags or marks may also indicate to other users of other receivers where they may obtain a license for the broadcast file. The tags or marks may indicate the artist, title of the song, or other data associated with the broadcast file.

One embodiment as described herein is directed to a portable or desktop radio receiver adaptable for receiving one or more broadcast streams on one or more broadcast channels. Some embodiments may allow a user of a portable or desktop radio receiver to create a composite stream from a portion of one or more broadcast streams.

Figure 2:
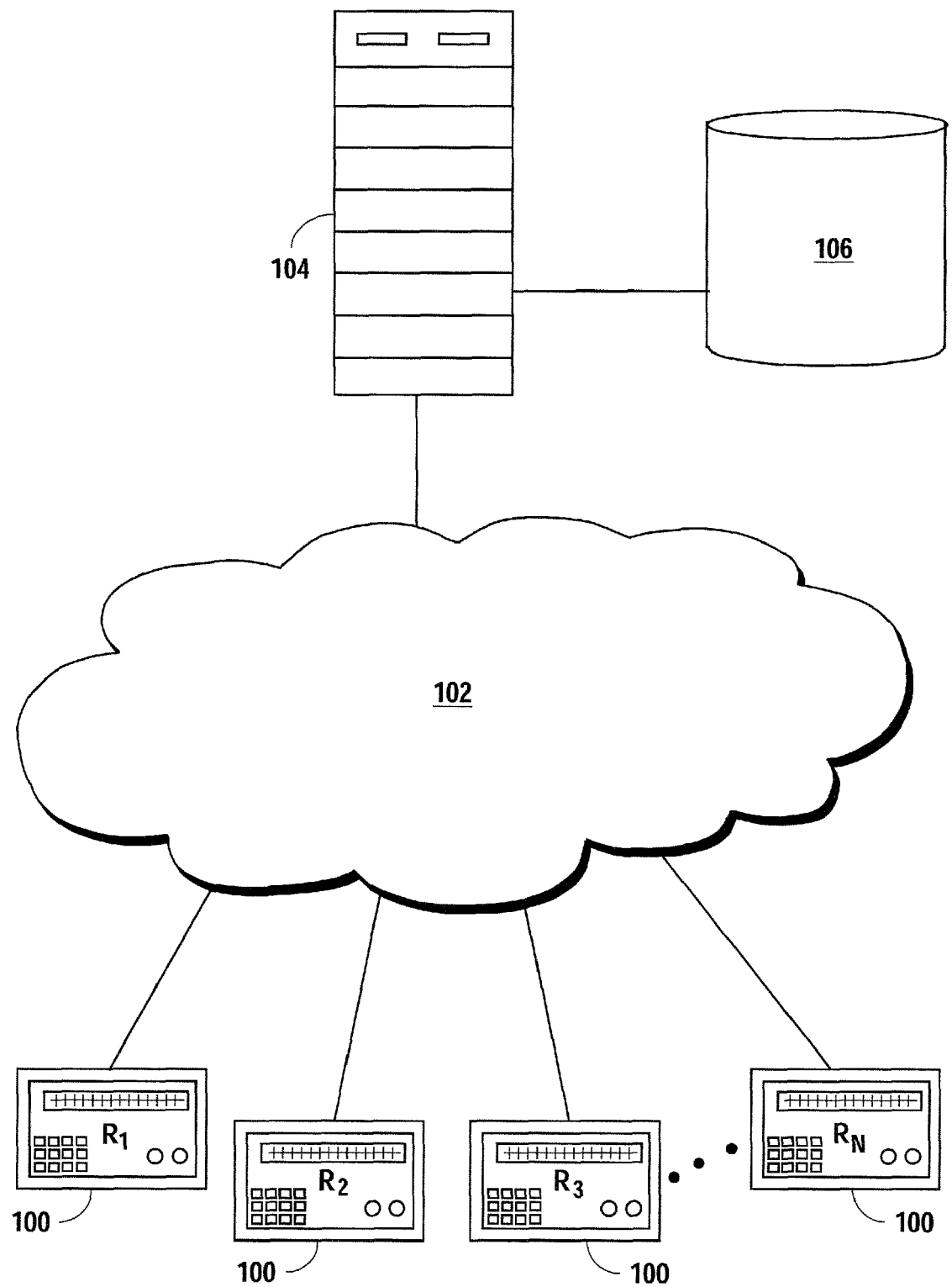
FIG. 2 is a schematic diagram of a radio system network as described herein.

Referring to FIGS. 1 and 2, a receiver 100 may comprise a computer and a memory and may be in communication with one or more sources of communications signals, such as FM, AM, HD, ST, and IP broadcast sources, for example, and one or more central computer systems 110. Each central computer system 110 may include but is not limited to a computer 104 and a data storage device 106 in communication with computer 104. Although only one computer 104 and data storage device 106 are shown in FIG. 2, more than one computer 104 and data storage device 106 may be provided. As shown in FIG. 2, a receiver 100 (indicated as $R_1 \ldots R_N$) may be in communication with computer 104, either directly or via a network 102, which may include but is not limited to the Internet. Each receiver 100 may be capable of receiving communications signals over one or more broadcast channels from the various broadcast sources, such as the FM, AM, HD, ST, and IP broadcast sources shown in FIG. 1, as well as one or more composite streams (CS) from one or more central computer systems 110 as described further below. Each receiver 100 may also have a transmitter adaptable for transmitting communications signals to computer 104 of one or more central computer systems 110 as described further below. The communications signals transmitted between and among the broadcast sources, receivers 100, and one or more central computer systems 110 may include primary data, such as songs, advertisements, talk shows, game shows, DJ chatter, news reports, weather reports, traffic reports, and sports reports, for example, as well as ancillary data, such as EPG data 101, for example.

In some embodiments, EPG data 101 may contain metadata information within broadcast streams, such as radio, television, satellite, and Internet broadcast streams. EPG data 101 may include but is not limited to metadata information such as station names, station call signs, broadcast frequencies, broadcast channel types, broadcast stream types, program titles, album titles, song titles, artist names, genres, durations, start times, end times, affiliated station carriers, keyword(s), and other metadata information relating to one or more broadcast streams. One or more central computer systems 110 may include various computer program applications, such as an EPG update interface 111 and a device services interface 113 to facilitate open interface merge replication as described further below. Data storage device 106 of one or more central computer systems 110 may be used to store various data, such as EPG data 101 and user preference data.

In some embodiments, a receiver 100 may have the capacity to receive and display EPG data 101 and to tune, browse, capture or download a selected broadcast stream on an available broadcast channel using metadata information from an EPG. For example, receiver 100 may be programmed to browse EPG data 101 such as station call signs, and a user may select a certain station call sign such as "KISS FM," for example. The receiver 100 may then be tuned to the user selected station, having the call sign "KISS FM."

The receiver 100 may include volatile memory storage to be used as a buffer for real time listening, providing the receiver 100 the ability to rewind, pause, and fast forward up to a desired point. The receiver 100 may also incorporate an EPG to enable a scheduled recording of one or more selected broadcast streams or enable an immediate recording of real time programming. In some embodiments, a receiver 100 may have the capacity to receive and display EPG data 101 and to tune, browse, capture or download a selected broadcast stream on an available broadcast channel. A broadcast stream may be selected manually or according to predefined rules. For example, receiver 100 may be programmed to attempt to tune in to a selected broadcast stream over a selected broadcast channel, and if the selected broadcast stream is not available on the selected broadcast channel, receiver 100 may then attempt to tune in to the selected broadcast stream over an alternative broadcast channel. Receiver 100 may be programmed to continue to search for the selected broadcast stream on successive alternative broadcast channels according to one or more rules of priority, which may be predetermined or established by a user, until the selected broadcast stream is found or all available broadcast channels are exhausted. For example, a user may select a certain radio station, such as KISS FM, and receiver 100 may be programmed first to seek the KISS FM station on an HD FM broadcast channel, and if that fails then seek that station on a regular FM broadcast channel, and if that fails then seek that station on an IP broadcast channel. Of course, any desired rules of priority may be used, and the foregoing example is merely illustrative. Receiver 100 may be programmed such that if the selected broadcast stream is not available on any of the available broadcast channels, then receiver 100 may display a message or produce a signal indicating that the selected broadcast stream is not currently available, tune in to a default or alternate broadcast stream, or go into a sleep mode. The default or alternate broadcast stream may be determined according to user preference data, such as a preferred genre, for example. Receiver 100 may also be programmed such that if the selected broadcast stream is not available on any of the available broadcast channels, then receiver 100 may allow the user to select comparable broadcast streams.

Some embodiments may include a database that may store the availability of various broadcast streams on various broadcast channels. The database may be stored locally in a memory in receiver 100, remotely in data storage device 106, or in both of those locations. In various embodiments, the database may contain data for all available broadcast streams in a given geographic area. Using a receiver 100, a user may browse or tune to all broadcast streams accessible in a user selected geographic area. For instance, a user may program a receiver 100 to search for broadcast streams in a certain zip code. The receiver 100 may access the database stored locally in a memory in receiver 100, remotely in data storage device 106, or in both of those locations to determine all broadcast streams on various broadcast channels available in the selected zip code. Additionally, broadcast streams and broadcast channels may be searchable using the database based on a selected city, state, or distance from receiver 100. Other embodiments may allow a user to search for all broadcast streams and broadcast channels using the database based on the IP address of receiver 100, the GPS location of receiver 100, positional information of receiver 100, or other geographic location of the receiver 100.

Some embodiments allow a receiver 100 to upload data of various broadcast streams on various broadcast channels in a given geographic area to the database in order to effectively populate the database for the benefit of all users. For instance, if a user in San Antonio, Tex. tunes his or her receiver 100 to a selected broadcast stream over broadcast channels HD or FM, such user may upload the data from his or her receiver 100 to the database to benefit all other users in San Antonio, Tex. seeking to tune to the selected broadcast stream. If a second user using another receiver 100 travels to San Antonio, Tex., the second user's receiver 100 may download data from the database to locate the same selected broadcast stream over broadcast channels HD or FM. Of course, the same upload and download processes may be applied to any available broadcast channel, not merely HD or FM. The upload and download processes may be automatic or upon request. Uploading of data to the database may enable multiple users to share data about broadcast streams, broadcast channels, and user preferences among a plurality of receivers 100. For example, a local user in Rome, Italy may upload data to the database from that user's receiver 100 allowing a tourist user traveling in Rome, Italy, for instance, to download data from the database. The tourist may then tune to all available broadcast streams over various broadcast channels in Rome. As another example, a user in New York City may discover a new broadcast stream not previously stored in the database. The user may upload the newly discovered broadcast stream data to the database and allow other New York City users to tune to the newly discovered broadcast stream after downloading the data from the database.

Other embodiments may allow a user of a receiver 100 to automatically download data from the database at periodic intervals. A user may also manually download data to receiver 100 from the database. Receiver 100 may take various forms, such as a desktop device or a mobile handheld device. Some embodiments may include user preferences that may be stored in the database such that a user preference stored for a desktop receiver may be transferred to a mobile handheld receiver, or vice versa.

Each broadcast channel may have a theoretically unlimited number of broadcast streams using that broadcast channel as a transport mechanism. Broadcast streams may interact with a system as described herein in at least three ways:

1. EPG Data Upload—EPG data from each broadcast stream may be uploaded to central computer system 110 via an EPG update interface on a regular or otherwise determined basis. The composite of this information from all broadcast streams across all broadcast channels may form a master EPG, which may be stored on data storage device 106.
2. Content Broadcast—The content of a broadcast stream may be broadcast by a source and picked up by a receiver 100 using, for example, its multi-channel receiver functionality.
3. Backchannel Reporting—A receiver 100 may report backchannel data to one or more central computer systems 110 concerning one or more broadcast streams received by receiver 100. This backchannel data may include, but is not limited to, listener play information, such as information about the particular content played, the types of content played, when the content is played, where the content is played, and so forth. Such backchannel data may be used by broadcasters to provide particular information targeted to certain listeners or geographic areas in future broadcasts.

Persons of ordinary skill in the art will recognize that various data may be stored in various locations and in various formats in a system as described herein. For example, desired playlist data may be stored in memory on one or more receivers 100 and on data storage device 106, and the formats in those locations may not be the same. To facilitate the use of such data in an orderly manner, a method of open interface merge replication ("OIMR") may be used. In such a system, certain data elements may at times be updateable in a variety of locations, such as, for example, on one receiver 100, another receiver 100 used by the same user, or data storage device 106, and those devices may not use the same data format. Also, of those devices, the situation may be such that no one data store is necessarily the "master," that is, the device whose information prevails if a conflict exists.

Figure 3:
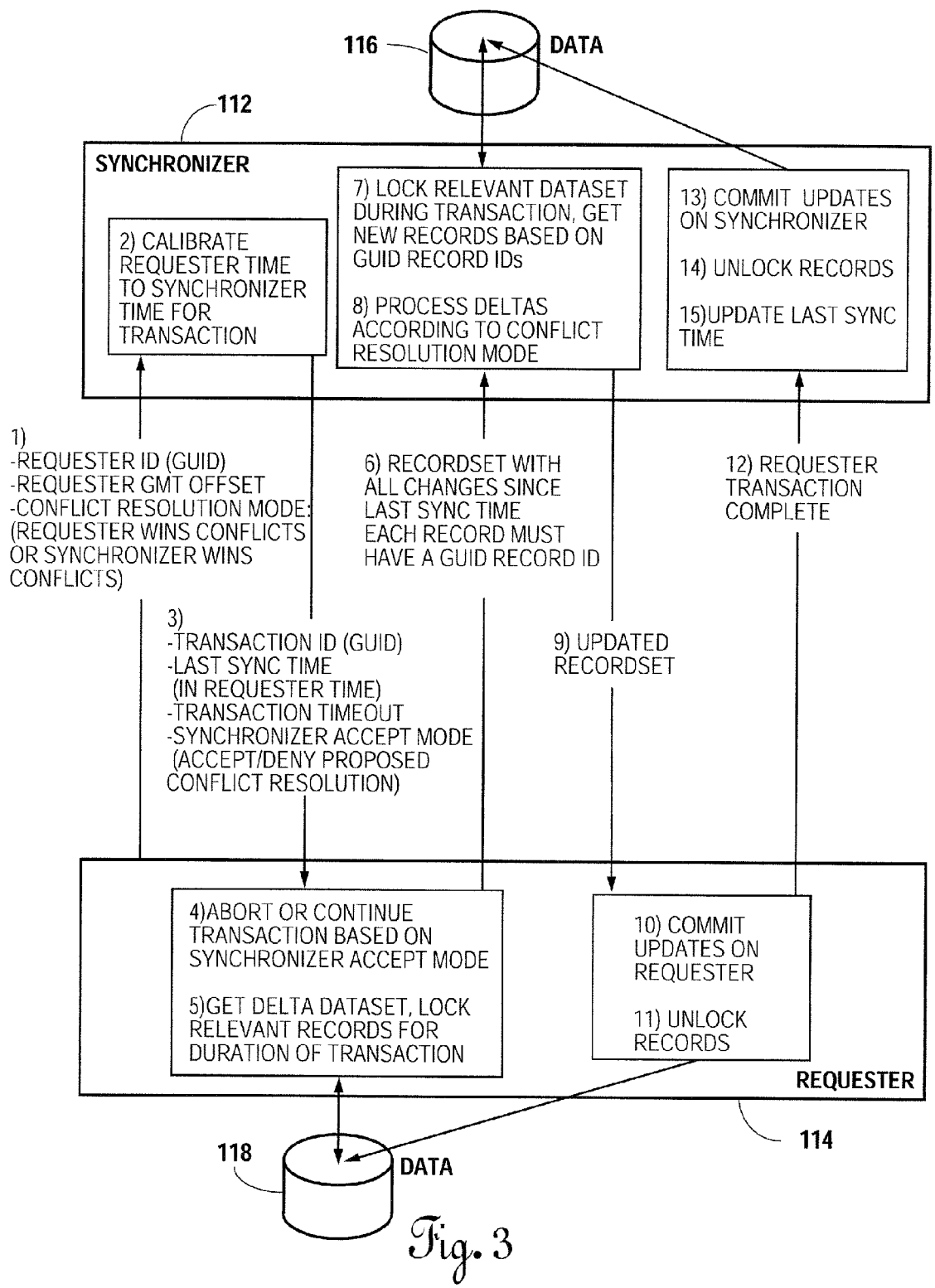
FIG. 3 is a schematic diagram that illustrates one embodiment of an open interface merge replication process.

FIG. 3 illustrates one embodiment of a method of OIMR. This method may allow two or more devices or databases 118 and 116, such as a memory of receiver 100 and data storage device 106 of one or more central computer systems 110, respectively, to be synchronized with each other as "requester" 114 and "synchronizer" 112. These devices may be able to store data locally, access data stored elsewhere, or both. Further, the data may or may not be of the same format. Such a solution may typically be oriented toward the synchronizer 112 being the master, but that need not be the case. The conflict resolution mode may be set as desired such that either the requester 114 or the synchronizer 112 wins any conflicts or "deltas" that are identified. The processing logic may be divided between the requester 114 and the synchronizer 112 in any relative amounts as desired. For example, a majority of the processing logic may be performed on whichever device is selected as the master. Depending on the particular situation, not all of the steps listed in FIG. 3 may be necessary, or additional steps may be included if desired.

Still referring to FIG. 3, a method of OIMR may involve a plurality of steps indicated as 1-15. For example, a requester 114 may request an update from a synchronizer 112, such as by sending a ping to a server. Such a request may be made, for example, manually, electronically, automatically or otherwise from time to time. In return, the synchronizer 112 may compare the data on the two devices and determine the differences, if any. Whether or not any differences or "conflicts" exist, the synchronizer 112 may then communicate an update of data to the requester 114, which may be accepted or rejected, for example, in accordance with predetermined instructions. On the other hand, the requester 114 may at times act as the master, such that any conflicts may be resolved in its favor. The data involved herein may include, for example, time settings, play lists, EPG information, records, recordsets or other data or portions thereof. The data, transactions, and/or devices involved in OIMR may be uniquely identified, such as by assigning a globally unique identifier ("GUID") to each of them, in order to sufficiently distinguish the different pieces of data.

Referring again to FIG. 3, a method of OIMR may have a plurality of applications. For example, a receiver 100 may allow a user to arrange a "preset" such that the user may quickly recall a favorite broadcast stream with the push of a button. However, the user may have a second receiver 100 at home or another location with a different preset or may choose a different preset through a web interface provided by one or more central computer systems 110 shown in FIG. 1. In such a situation, for example, the user may wish that any changes to a preset made via the web interface automatically take effect on the home receiver(s) as well. Thus, questions may arise, for example, as to which user settings control, or whether the home receivers are affected by changes made elsewhere. A preset may be bi-directional. For example, a preset may be set on a local receiver and pushed up to a centralized server, or such preset may be set on a centralized server via a web site and pushed to a local receiver or other devices. A local database on a receiver may be incrementally updated such that a given update may not necessarily replace all of the database but may only update the difference in versions as needed or desired between the local database and a centralized database, for example. Each radio station, such as over the air (OTA), Internet, and HD2, for example, may be given a unique ID—for example, a KOGA-FM OTA station may have a different station ID than a KOGA streaming Internet station, and a KOGA HD2 station may have a different station ID than the OTA station and the streaming Internet station. While a preset is used herein as an example, other types of data, content or instructions may also be changed on various system components and in a variety of ways. Thus, changes or updates may be made to similar data in a plurality of locations.

Receiver 100 may be programmable to perform time shifted playback, in which a user may save some data to a local storage device on receiver 100 and play that content at a later time. Receiver 100 may also be programmable to allow a user to create personal playlists and send such playlists to another user, such as through the database discussed herein. Receiver 100 may also be programmable to allow a user to create a composite stream and distribute that composite stream, or an EPG for that composite stream, to others.

Figure 4:
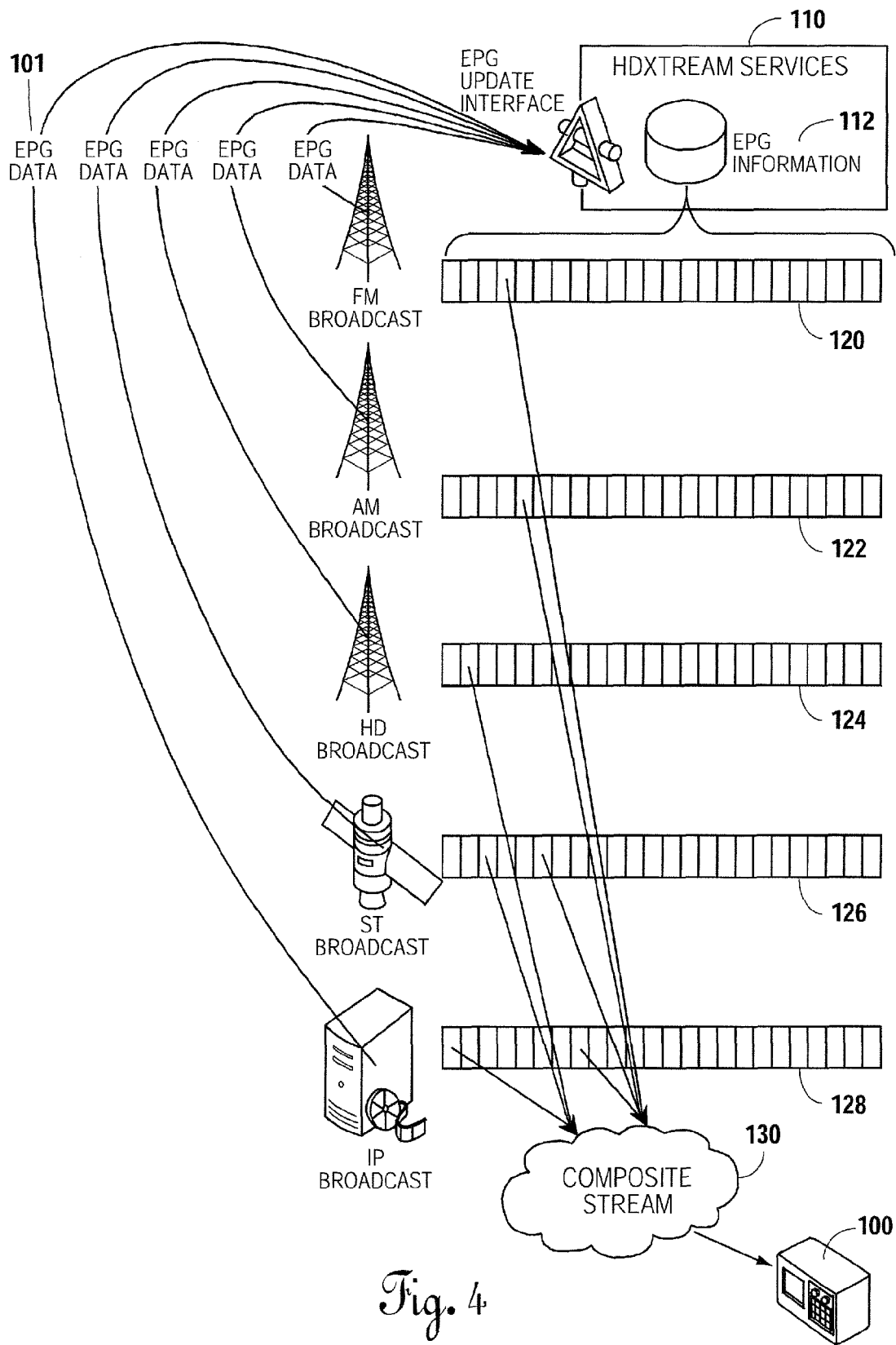
FIG. 4 is a schematic diagram that illustrates one embodiment of an EPG-based composite stream as described herein.

FIG. 4 illustrates the creation of an EPG-based composite stream 130 that comprises one or more pieces of data selected from one or more broadcast streams 120, 122, 124, 126, and 128. This functionality of receiver 100 may allow a user to create a unique "station" and to share it with others without having to have access to the physical equipment of the source of a broadcast channel or broadcast stream. For example, a user may compile a unique play list including his or her favorite streams or songs and may share that play list with others. Further, a user may, for example, record a series of selected songs from a variety of broadcast streams and may then have the ability to share that recording with other users. Composite streams may provide an avenue for the publication of a wide variety of specialized and unique broadcast streams without the need for additional broadcast channel infrastructure. This may create an environment for low cost experimentation with new data formats and also economic viability for niche content, or data, formats.

Figure 5:
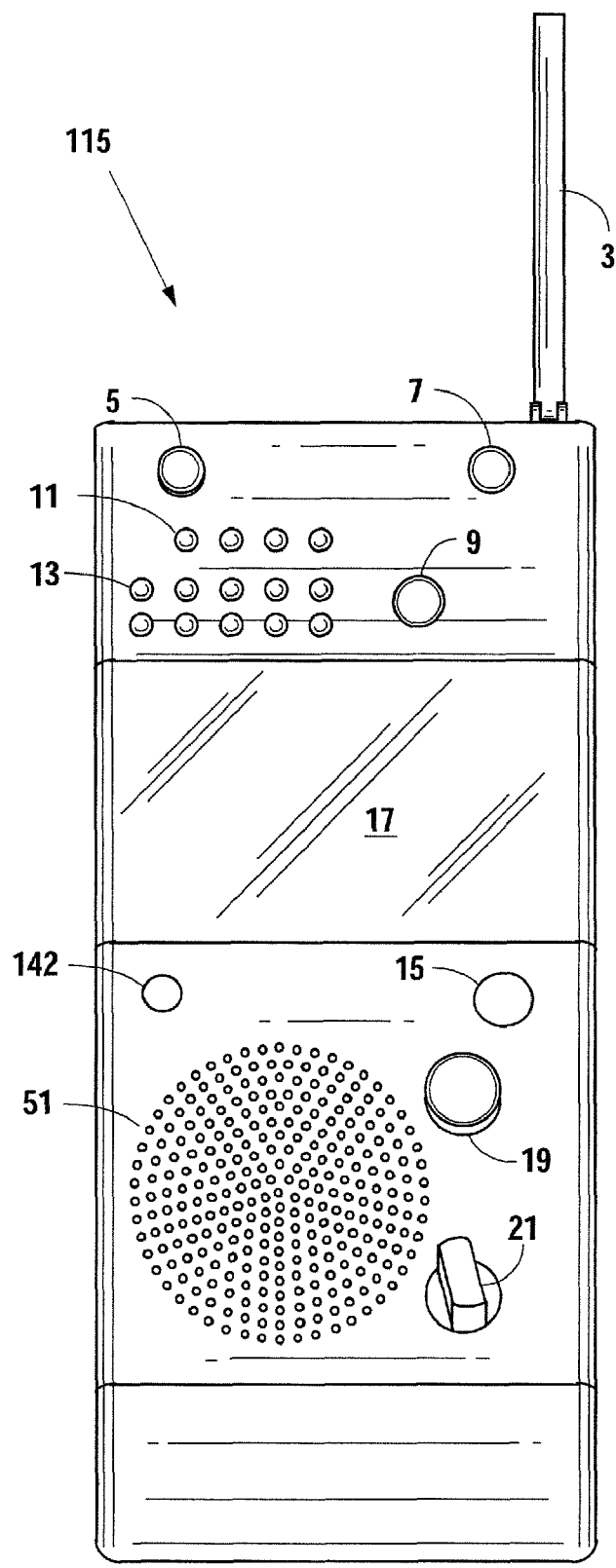
FIG. 5 is a front elevational view of a radio receiver.
Figure 6:
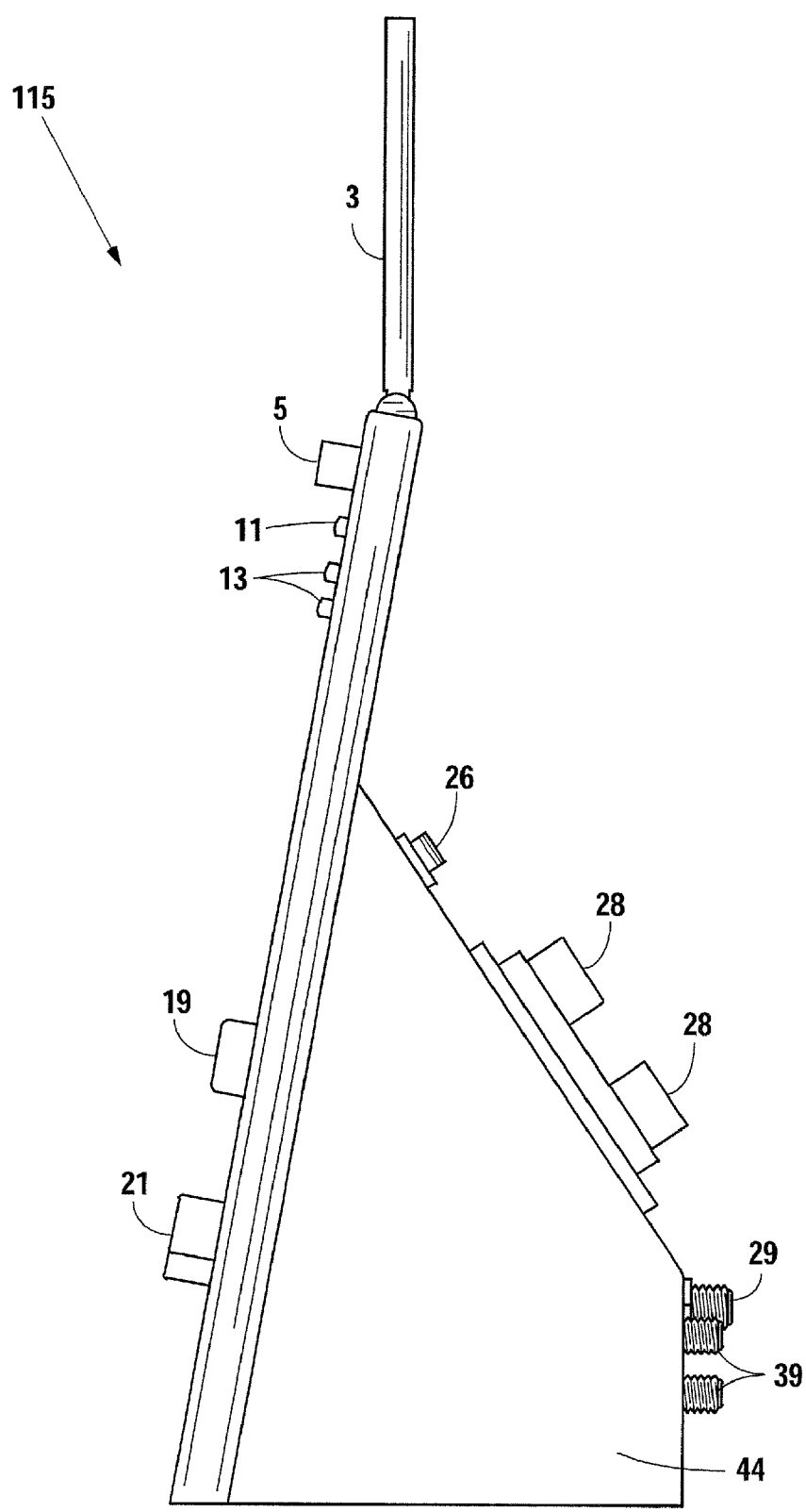
FIG. 6 is a left side elevational view of the radio receiver of FIG. 5.
Figure 7:
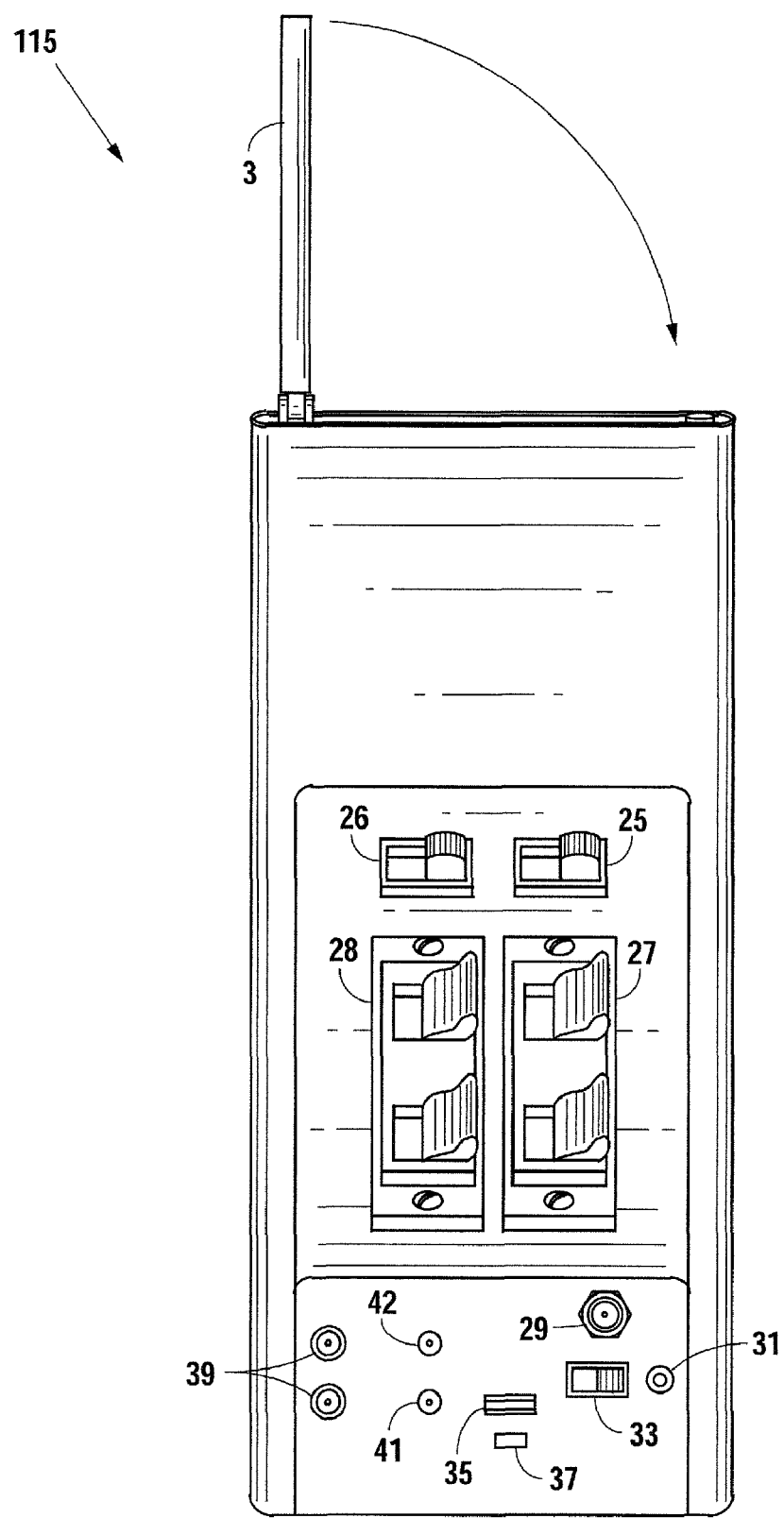
FIG. 7 is a back elevational view of the radio receiver of FIG. 5.

Receiver 100 may take various forms, such as a desktop device or a mobile handheld device that may dock in a car, at home, or runs off of a battery. One embodiment 115 of a receiver 100 is illustrated in FIGS. 5-7. Receiver 115 may have one or more N/W/T/S presets 11 for news, weather, traffic and sports. A user may create a playlist of one or more N/W/T/S presets 11, for instance, a sports playlist for sports broadcast streams in Dallas, Tex. In some embodiments, one or more N/W/T/S presets 11 may include broadcast streams targeted to school closings, or lunch menus at schools in a geographic area, for example. In other embodiments, one or more N/W/T/S presets 11 may include traffic data from various traffic services. A user may program which traffic routes and other data they are most interested in and the receiver 115 may display the data or traffic routes in either a text or graphical manner. Targeted news, weather, traffic and sports may therefore be broadcast to a receiver 115 based on a user's configuration.

Still referring to FIGS. 5-7, a receiver 115 may also include one or more channel presets 13; a tuning knob 19 for controlling tuning of receiver 115 while playing over the air (OTA) signals or WiFi signals; a volume and on/off knob 21; an infrared (IR) window 7 for communicating wirelessly with other communications devices; a record button 9 for recording data on receiver 115; a mute switch 15 for muting receiver 115; a display 17 for displaying information; an internal speaker 51 for playing sound; an alarm button 5 for activating or disabling a user configured alarm; and an included antenna 3 for receiving broadcast streams. Included antenna 3 may be a telescoping or other suitable type of antenna. Alternatively or additionally, an internal antenna may be provided. A snooze button (not shown) may also be included on the receiver 115.

Most radio alarms may only be configured to assign a buzzer or an FM or AM broadcast channel as the alarm sound. If the FM or AM broadcast channel is weak, the alarm sound may be radio static instead of the selected broadcast stream. In one embodiment, a receiver 100 may be programmed to assign a recorded playlist as the alarm sound. The receiver 100 may also be programmed to assign a user selected broadcast stream whereby if an FM or AM broadcast channel is weak, the receiver 100 may search for an alternative broadcast channel such as an HD or IP broadcast channel, for example. The receiver 100 may also be programmed to assign a default buzzer as the alarm sound. In some embodiments, the receiver 100 may be programmed to assign a podcast as the alarm sound. Other receivers 100 may include an alarm that can be programmed for dayparting, wherein at least two alarm settings, for instance from Monday to Friday, and Saturday to Sunday, are set.

Referring again to FIGS. 6 and 7, receiver 115 may include an FM antenna switch 25 to allow a user to select between the included antenna 3 or an external antenna (not shown); an AM antenna switch 26 to allow a user to select between the included antenna 3 or an external antenna (not shown); a 300Ω FM antenna connection 27; an AM antenna connection 28; a 75Ω FM antenna connection 29; a power connector 31; a network port 33; a wireless network port 35; a USB connector 37 for providing power and/or data to the receiver 115; line in/line out jacks 39 to allow the receiver 115 to connect to other audio/video sources or external speakers or other output devices; a headphone jack 41; an iPod adapter 42 to allow the receiver 115 to broadcast a communications signal from an external iPod; and a base 44. Network port 33, USB connector 37, and wireless network port 35 may be provided to allow the receiver 115 to connect to the Internet or other suitable network. Additionally, a receiver 115 may contain an internal wireless adapter to connect to the Internet or other suitable network. USB connector 37 may also be used to connect the receiver 115 to a computer to output sound or data from the receiver 115 to a computer's speakers or other suitable device. USB connector 37 may also be used to connect a computer to the receiver 115 to output sound from the computer to the internal speaker 51 of the receiver 115.

Referring again to FIG. 5, in some embodiments, a channel selector switch 142 may be included in the receiver 115 for manually selecting one or more broadcast channels, such as AM, FM, HD, or WiFi, for example. Other embodiments may seamlessly switch between available broadcast channels without any manual selection. For instance, HD digital and IP broadcast channels normally have a time delay in broadcasting the communications signal. A receiver 115 may first select broadcast channels FM or AM after a user selects a broadcast stream, then automatically switch to an HD digital broadcast channel to avoid any time delay. Alternatively, a user may manually force a receiver 115 to a certain broadcast channel using channel selector switch 142. For instance, a user may be located in a building with poor FM or AM reception. Therefore, a user may program the receiver 115 to only tune to broadcast channels such as WiFi or other Internet broadcast channels, for example.

Some broadcast channels or broadcast streams require a subscription or payment of some form to receive and use the broadcast stream or broadcast channel. For instance, some satellite radio stations require subscriptions to receive their broadcast stream. Many conditional access broadcast streams or broadcast channels use NDS technology to encrypt the signal, and typically require some form of a pass card or ID to enable the broadcast stream or broadcast channel. Of course, other forms of identification may be used to enable the broadcast stream or broadcast channel. In one embodiment, a receiver 100 may access conditional access broadcast streams or broadcast channels by using a pass card or ID. The receiver 100 may also support downloading podcasts directly to the receiver 100 based on standard RSS subscription processes or other suitable methods. In an alternative embodiment, a receiver 100 may allow a broadcast stream to be marked or tagged by the user as a purchase interest. The receiver 100 may include a tag button (not shown) that allows the user to mark or tag a broadcast stream or file received or played by the receiver 100. The marks or tags may then be saved on the receiver 100 and transmitted to the respective retail service such as iTunes®, Amazon®, or Zune Marketplace™, for example, for purchase, preview, indexing, or downloading to the receiver 100.

Other and further embodiments utilizing one or more aspects of the systems and methods described above may be devised without departing from the spirit of Applicant's invention. For example, the above OIMR methodology may be an advantage to any system that seeks to support merge replication and database interoperability. Further, the various systems, methods, and embodiments disclosed herein may be included in combination with each other to produce variations of the disclosed systems, methods, and embodiments. Discussion of singular elements can include plural elements and vice-versa.

The order of steps in methods described herein may occur in a variety of sequences unless otherwise expressly stated. The various steps described herein may be combined with other steps, interlineated with the stated steps, or split into multiple steps. Similarly, elements described functionally may be embodied as separate components or may be combined into components having multiple functions.

The apparatus, systems, and methods disclosed in this application have been described in the context of certain exemplary embodiments, and not every embodiment of the invention has been described. Various modifications and alterations to the described embodiments are discernible to persons of ordinary skill in the art. The disclosed and undisclosed embodiments are not intended to limit or restrict the scope or applicability of the invention claimed herein, but rather, in conformity with the patent laws, Applicants intend to fully protect all such modifications and improvements that come within the scope of the appended claims, including equivalents thereof.

The foregoing figures and written description of specific structures and functions are not presented to limit the scope of what Applicants have invented or the scope of the appended claims. Rather, they are provided to teach a person of ordinary skill in the art how to make and use the inventions for which patent protection is sought and the best mode of practicing the same. Those persons skilled in the art will appreciate that not all features of a commercial embodiment of the inventions are described or shown for the sake of clarity and understanding. Persons of ordinary skill in the art will also appreciate that the development of an actual commercial embodiment incorporating aspects of the present inventions may require numerous implementation-specific decisions to achieve the developer's ultimate goal for the particular commercial embodiment. Such implementation-specific decisions may include, but likely are not limited to, compliance with system-related, business-related, government-related and other constraints, which may vary by specific implementation, location and from time to time. While a particular developer's efforts might be complex and time-consuming in an absolute sense, such efforts would be, nevertheless, a routine undertaking for those of ordinary skill in the art having the benefits of this disclosure. It must be understood that the inventions disclosed and taught herein are susceptible to numerous and various modifications and alternative forms.

What is claimed is:

1. A radio receiver comprising:
a receiver adaptable for receiving a plurality of broadcast streams over a plurality of broadcast channels;
a computer processor in communication with said receiver; and
a memory in communication with said processor;
said memory comprising a computer program comprising:
instructions for causing said receiver to attempt to receive a selected broadcast stream on a selected broadcast channel, and if said selected broadcast stream is not receivable on said selected broadcast channel, to attempt to receive said selected broadcast stream on an alternative broadcast channel, and
instructions for causing said receiver to attempt to receive said selected broadcast stream on successive alternative broadcast channels according to at least one rule of priority.

2. The radio receiver of claim 1 wherein said plurality of broadcast channels comprises at least one HD channel and at least one non-HD channel.

3. The radio receiver of claim 1 wherein said plurality of broadcast channels comprises at least one AM channel, at least one FM channel, at least one HD channel, at least one IP channel, at least one ST channel, and at least one CS channel.

4. The radio receiver of claim 1, wherein the computer program further comprises instructions to allow a user to select a comparable broadcast stream in response to determining that said selected broadcast stream is not receivable on any of the successive alternative broadcast channels.

5. the radio receiver of claim 1, wherein said selected broadcast stream is a preset broadcast stream.

6. the radio receiver of claim 1, wherein the computer program further comprises instructions to allow a user to establish the at least one rule of priority.

7. The radio receiver comprising:
a receiver adaptable for receiving a plurality of broadcast streams over a plurality of broadcast channels;
a computer processor in communication with said receiver;
a memory in communication with said processor; and
said memory comprising a computer program comprising:
instructions for causing said receiver to attempt to receive a selected broadcast stream on a selected broadcast channel, and if said selected broadcast stream is not receivable on said selected broadcast channel, to attempt to receive said selected broadcast stream on an alternative broadcast channel, wherein said plurality of broadcast channels comprises at least one HD channel and at least one non-HD channel, wherein said computer program comprises at least one rule of priority comprising instructions for executing a first attempt to receive said selected broadcast stream on said at least one HD channel, and if said first attempt fails, then executing a second attempt to receive said selected broadcast stream on said at least one non-HD channel.

8. A method comprising:
attempting to receive, at a radio stream receiver, a selected broadcast stream on a first broadcast channel; and
in response to being unable to receive the selected broadcast stream on the first broadcast channel, attempting to receive the selected broadcast stream on successive alternative broadcast channels according to at least one rule of priority.

9. The method of claim 8, comprising allowing a user to select a comparable broadcast stream if the selected broadcast stream is not receivable on any of the successive alternative broadcast channels.

10. A radio receiver comprising:
a communications interface to receive a plurality of preset broadcast streams over a plurality of broadcast channels;
a computer processor;
a memory in communication with said computer processor;
a user interface in communication with the computer processor, the user interface configured to receive user input creating a targeted playlist comprising at least part of at least one preset broadcast stream; and
a program of instructions to be stored in the memory and executed by the computer processor, the program of instructions comprising:
at least one instruction to attempt to receive the at least one preset broadcast stream on a selected broadcast channel, and
at least one instruction to, in response to being unable to receive the at least one preset broadcast stream on the first broadcast channel, attempt to receive the at least one preset broadcast stream on successive alternative broadcast channels according to at least one rule of priority.

11. The radio receiver of claim 10, wherein the program of instructions further comprises at least one instruction to allow a user to select a comparable broadcast stream if the at least one preset broadcast stream is not receivable on any of the successive alternative broadcast channels.

12. The radio receiver of claim 10, wherein the program of instructions further comprises at least one instruction to allow a user to establish the at least one rule of priority.

13. A radio receiver comprising:
a receiver adaptable for receiving a plurality of broadcast streams over a plurality of broadcast channels, said plurality of broadcast channels comprises at least one HD channel and at least one non-HD channel;
a computer processor in communication with said receiver; and
a memory in communication with said processor;
said memory comprising a computer program comprising:
instructions for causing said receiver to attempt to receive a selected broadcast stream on a selected broadcast channel, and if said selected broadcast stream is not receivable on said selected broadcast channel, to attempt to receive said selected broadcast stream on an alternative broadcast channel, and
at least one rule of priority comprising instructions for executing a first attempt to receive said selected broadcast stream on said at least one HD channel, and if said first attempt fails, then executing a second attempt to receive said selected broadcast stream on said at least one non-HD channel.

14. The radio receiver of claim 13, wherein the computer program further comprises instructions for causing said receiver to attempt to receive said selected broadcast stream on successive alternative broadcast channels according to at least one rule of priority.

15. The radio receiver of claim 14, wherein the computer program further comprises instructions to allow a user to select a comparable broadcast stream in response to determining that said selected broadcast stream is not receivable on any of the successive alternative broadcast channels.

16. The radio receiver of claim 14, wherein said selected broadcast stream is a preset broadcast stream.

17. The radio receiver of claim 13, wherein said plurality of broadcast channels comprises at least one AM channel, at least one FM channel, at least one HD channel, at least one IP channel, at least one ST channel, and at least one CS channel.

18. The radio receiver of claim 13, wherein the computer program further comprises instructions to allow a user to establish the at least one rule of priority.

19. A method comprising:
enabling a radio receiver to attempt to receive a selected broadcast stream on a selected broadcast channel, said plurality of broadcast channels comprising at least one HD channel and at least one non-HD channel; and
enabling the radio receiver to respond to being unable to receive the selected broadcast stream on the first broadcast channel by attempting to receive the selected broadcast stream on successive alternative broadcast channels according to at least one rule of priority, the at least one rule of priority comprising instructions for executing a first attempt to receive said selected broadcast stream on said at least one HD channel, and if said first attempt fails, then executing a second attempt to receive said selected broadcast stream on said at least one non-HD channel.

20. The method of claim 19, wherein the selected broadcast stream is a preset broadcast stream.

21. The method of claim 20, comprising enabling the radio receiver to allow a user to select a comparable broadcast stream if the preset broadcast stream is not receivable on any of the successive alternative broadcast channels.

22. The method of claim 19, wherein said plurality of broadcast channels comprises at least one AM channel, at least one FM channel, at least one HD channel, at least one IP channel, at least one ST channel, and at least one CS channel.

23. A method comprising:
enabling a radio receiver to attempt to receive a selected broadcast stream on a selected broadcast channel; and
enabling the radio receiver to respond to being unable to receive the selected broadcast stream on the first broadcast channel by attempting to receive the selected broadcast stream on an alternative broadcast channel; and
enabling the radio receiver to attempt to receive the selected broadcast stream on successive alternative broadcast channels according to at least one rule of priority.

24. The method of claim 23, wherein the selected broadcast stream is a preset broadcast stream.

25. The method of claim 23, comprising enabling the radio receiver to allow a user to select a comparable broadcast stream if the selected broadcast stream is not receivable on any of the successive alternative broadcast channels.

* * * * *